June 28, 1932.   D. J. SMITH   1,865,341
GAS PRODUCER
Filed Dec. 29, 1927
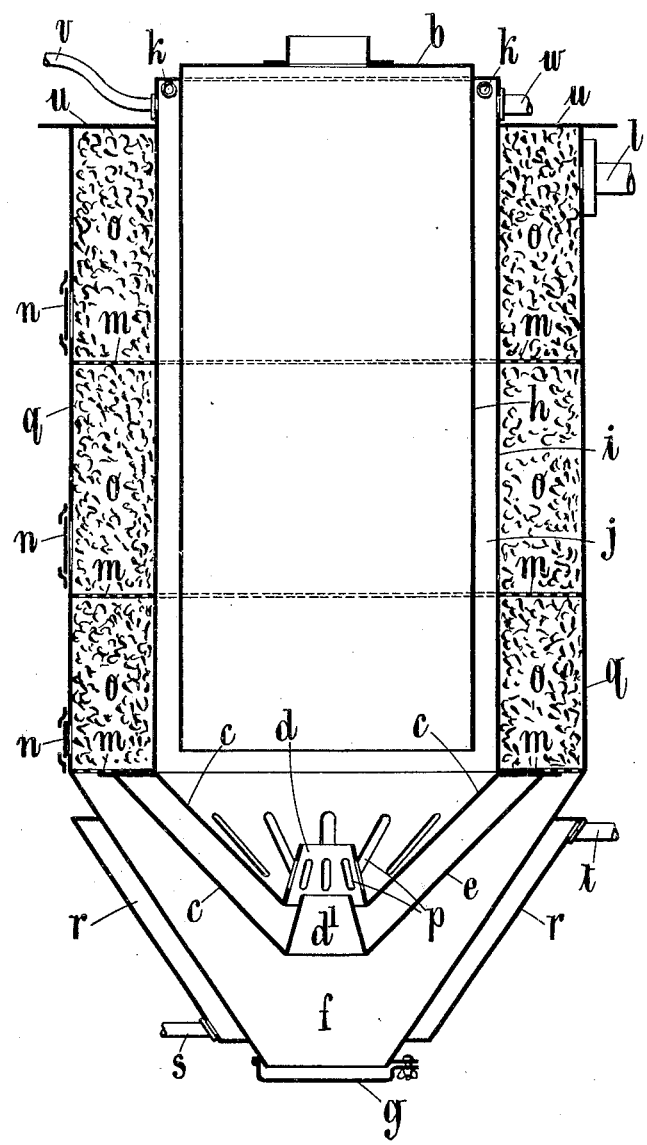
INVENTOR
David J. Smith
BY
William C. Sinton.
ATTORNEY Patented June 28, 1932

1,865,341

UNITED STATES PATENT OFFICE

DAVID JOSEPH SMITH, OF MAPLEDURHAM, ENGLAND, ASSIGNOR TO COMPOUND GAS POWER COMPANY, LIMITED, OF READING, BERKSHIRE, ENGLAND

GAS PRODUCER

Application filed December 29, 1927, Serial No. 243,393, and in Great Britain July 20, 1927.

This invention relates to gas producers working on the down draft principle and designed for dealing with fuels of high volatile content, for example, wood, lignite, and the like, and of either the suction or pressure types, that is to say, of the kind in which the gas is drawn from the producer by the suction of an engine or that in which the supply is assisted by pressure supplied by a fan or the like.

The object of the invention is to provide an improved construction of gas producer.

According to this invention part of the gas is led to a restricted passage where the other part of the gas drawn from the most intense zone of combustion meet and mix with it thus tending to break up any volatile matters.

The said gas is arranged to impinge on a surface of refractory material which, becoming incandescent, tends to convert any volatile matters contained therein into a fixed gas.

Combustion is arranged to take place in a grate or grates of special design in which part of the hot proceeds of combustion impinge on a surface of refractory material, which becoming incandescent, tends to convert any volatile matters contained in such proceeds, into a fixed gas. This part of the proceeds of combustion is led to a restricted passage where the other part of the gases, drawn from the most intense zone of combustion, meet and mix with it, thus still further tending to break up any volatile matters.

Means may be provided whereby the heat contained in the gases is utilized in heating the incoming air or vaporizing any fluid which it may be desired to admit with the air, the same heating device also acting as a filter to remove any dust or solid particles carried over with the gas.

This invention will now be described with reference to the accompanying drawing which is a sectional elevation of one form of gas producer constructed in accordance with this invention.

The producer consists of an outer chamber $q$ of circular or square section and of any suitable length and having at its upper end a cover $u$ and at its lower end a frusto-conical hopper or ash box $f$. Inside the chamber $q$ is a tubular member $i$ terminating at its lower end with the frusto-conical grate $c$, and inside this member $i$ is a smaller tubular member $h$. The annular space between the two members $h$, $i$, constitutes a passage $j$.

At the upper end of the member $i$ is a sliding plate $k$ which controls the admission of air to the space $j$.

The tubular member $h$ constitutes the fuel preheating and distillation chamber and is furnished with a removable air-tight lid $b$.

The space between the wall of the outer container $q$ and the tubular member $i$ which constitutes a producer gas outlet chamber is fitted with several gas baffle plates $m$ having suitable perforations therein to allow the gas to pass evenly through them into a number of scrubbing spaces $o$, $o$. These spaces $o$, $o$, are filled with suitable material to filter the gas, such as steel turnings, or the like. Doors $n$ are provided to give access to the spaces $o$, $o$ for cleaning out and renewing the filter material.

The hopper or ash box $f$ is fitted with a removable but air-tight door $g$ for the removal of ash and to afford down draft to the fire when necessary.

The main grate $c$ is of inverted frustro-conical configuration and carries a secondary frusto-conical grate $d$ rising from its truncated end but which is closed at its upper end. Both grates $c$ and $d$ are formed with perforations or slots $p$ of suitable number and size.

Encircling the main grate $c$ is a similarly shaped inverted frustro-conical member $e$ of thin refractory material. This cone carries at its lower end a smaller inverted frusto-conical member $d^1$ open at its upper end and which projects a certain distance into the grate $d$.

The ash box or hopper $f$ is encircled by a jacket $r$ provided with an inlet pipe $s$ and outlet $t$. The outer chamber $q$ is provided with a gas outlet $l$.

The operation of the gas producer is as follows:—

The cover $b$ is removed and a fire lighted in the fuel chamber $h$ in any suitable manner the door $g$ being opened to obtain the necessary draft. Fresh fuel is added as required and when the necessary heat has been obtained, the fuel chamber $h$ is filled, and the cover $b$ and door $g$ closed. Suction is then applied at the gas outlet $l$ and the generated gases pass down through the grates $c$ and $d$, through the slots $p$.

The main portion of the gas impinges on the frustro-conical member $e$ and, passing down to the bottom end, is deflected by the frustro-conical member $d^1$ up the inside of the secondary grate $d$ where it is met by that portion of the gas passing through the slots $p$ in grate $d$ and arising from the hottest part of the fuel bed. The frusto-conical member $e$ rapidly attains a high temperature as also does frusto-conical member $d^1$, and the gas impinging on these and mixing with the intensely hot gas from grate $d$, have any volatile matters contained therein broken up and converted into a fixed producer gas.

Air to support combustion enters through the slide $k$, which can be regulated as desired, and passes down between the space $j$, entering the fire just above the zone of greatest intensity. The incoming air is warmed in its passage through $j$ by conducted heat in the tube $i$ arising from the heat of the gas generating chamber and the heat of the gas passing around the outside of it in the spaces $o$, $o$.

The gas, on leaving the member $d^1$ passes into the ash box or hopper $f$ where most of the dust or solid matter in suspension is deposited. The gas then passes through the perforations in the baffle plates $m$ to ensure even distribution and is cleaned by the filtering material in the spaces $o$, $o$ and finally passes out through the gas outlet $l$.

In the case of some fuels it is desirable to add steam or other vapors to the air, and to do this, water or other fluid is poured into the jacket $r$ around the hopper or ash box $f$.

The water is admitted by the pipe $s$ and the steam is taken off by the pipe $t$ and enters through the pipe $v$. The level of the water may be maintained and mixes with the air in the space $j$ in the jacket $r$ by any suitable means, for example, by a float chamber as used in connection with petrol carburettors (not shown).

Extra fuel can be added at any time by removing the cover $b$ and without stopping the operation of the producer.

If it is desired to operate the producer under pressure, air under pressure from an outside source may be introduced at $w$, the air slide $k$ being kept closed, the air being regulated by a valve of any suitable type on $w$.

With a producer constructed in accordance with this invention, the grates and baffles succeed in breaking up volatile matters contained in the gas by making all the gas pass through a retort formed by the inside of grate $d$ where it is subjected to the most intense heat of the fire and mixed with a portion of hot gases from the most intense combustion zone.

Further, by admitting air just above the combustion zone and sealing the fuel chamber at its upper end, the fire is prevented from climbing up the fuel bed.

The sudden expansion of the gas through the frusto-conical member $d^1$ into the ash pan, cleans it, and the gases are further cleaned by filtering material in spaces $o$ encircling the producer.

A great advantage with this producer is that the initial heating up can be obtained by natural draft without the aid of a fan.

What I claim is:—

In a down draft gas producer, a fuel gasifying chamber, a gas filtering chamber surrounding said gasifying chamber and arranged concentrically thereto, a frusto-conical grate projecting downwardly from said gasifying chamber and having a re-entrant portion formed at its lower end, said gasifying chamber being spaced from said gas filtering chamber to form an air passageway therebetween communicating with the space immediately above said grate and with the top of the producer, and a frusto-conical baffle surrounding the under side of said grate and having a re-entrant portion concentrically arranged with respect to the re-entrant portion of said grate.

In testimony whereof he affixes his signature.

DAVID JOSEPH SMITH.